US006022455A

United States Patent [19]

Otake

[11] Patent Number: 6,022,455

[45] Date of Patent: Feb. 8, 2000

[54] LIGHT IRRADIATION METHOD AND ITS APPARATUS

[75] Inventor: Shiro Otake, Neyagawa, Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/595,984

[22] Filed: Feb. 6, 1996

[30] Foreign Application Priority Data

Feb. 7, 1995 [JP] Japan .................................... 7-019087

[51] Int. Cl.[7] ...................................................... B01J 19/08

[52] U.S. Cl. ................................ 204/157.6; 204/157.61; 607/88; 362/804; 422/186; 422/186.3

[58] Field of Search ............................ 204/157.15, 157.6, 204/157.61; 607/88; 362/804; 422/186, 186.3

[56] References Cited

U.S. PATENT DOCUMENTS

| | | | |
|---|---|---|---|
| 4,965,174 | 10/1990 | Arai et al. | 430/340 |
| 5,248,899 | 9/1993 | Haronian et al. | 307/201 |
| 5,367,446 | 11/1994 | Elion | 362/184 |
| 5,450,292 | 9/1995 | Yokoyama et al. | 362/31 |
| 5,470,690 | 11/1995 | Lewis et al. | 430/269 |
| 5,557,440 | 9/1996 | Hanson et al. | 359/161 |
| 5,563,704 | 10/1996 | Fitzpatrick | 356/347 |
| 5,584,556 | 12/1996 | Yokoyama et al. | 392/31 |

FOREIGN PATENT DOCUMENTS

WO 91/06078 5/1991 WIPO .

OTHER PUBLICATIONS

M. Catt et al., "The Products of Photoreversing Rhodopsin Bleaching by Microsecond Flashes in the Isolated Vertebrate Retina", Vision Research, vol. 23, No. 10, pp. 971–982 (1983). month unavailable.

J. Chalecki et al., "Design Possibilities of Illuminator Optimization Based on Escalation of Human Eye Sensitivity in Pulsed Light", 1983 European Optical Conference (EOC 83): Optics In Science and Practice, Rydzyna, Poland, Optics Applicata, vol. 14, no. 1, pp. 59–63 (1984), month unavailable.

G.P. Lubert et al., "Rhodopsin and its Thermal Intermediates: Fast Structural Fluctuations in their Protein Component", Journal of Biological Physics, vol. 6, No. 3–4, pp. 96–104 (1978). month unavailable.

W. Ernst et al., "The Effects of Rhodopsin Decomposition on PIII Responses of Isolated Rat Retinae", Vision Research, vol. 12, No. 12, pp. 1937–1946 (1972). month unavailable.

H. Ohtani et al., "Primary Processes in Photolysis of Octopus Rhodopsin", Biophysical Journal, vol. 53, No. 1, pp. 17–24 (1988).

European Search Report corresponding to 96101662.3 dated Jul. 2, 1997.

(List continued on next page.)

*Primary Examiner*—T. Tung
*Assistant Examiner*—Alex Noguerola
*Attorney, Agent, or Firm*—Ratner & Prestia

[57] ABSTRACT

A light irradiation method and apparatus which emits light to avoid a photochemical reaction which returns an intermediate product to a pigment, in which a photochemical reaction or a thermochemical reaction transforms the pigment into the intermediate product, and at least a thermochemical reaction transforms the intermediate product into a pigment decomposed substance. Therefore, the photosensitization by irradiation with light is made brighter without increasing the total quantity of photons by irradiation with light in a specific time.

17 Claims, 13 Drawing Sheets

OTHER PUBLICATIONS

CAPLUS abstract of Kruizinga et al. ("Laser induced visual pigment conversions in fly photoreceptors measured in vivo", Biophys. Struct. Mech. (1983), 9(4), 299–307), month unavailable.

Druckman et al. ("The back photoreaction of the M intermediate in the photocycle of bacteriorhodopsin: mechanism and evidence for two M species", Photochem. Photobiol. (1992), 56(6), 1041–7), month unavailable.

Druckman et al. ("Thermal equilibration between the M and N intermediates in the photocycle of bacteriorhodopsin", Biophys. J. (1993), 65(3), 1231–4), month unavailable.

Dancshazy et al. (FEBS Lett. 1986, 196(2), 198–202, "The photochemical cycle of bacteriorhodopsin has no refractory period"), Feb. 1986.

Tokaji et al. (Colloq. INSERM 1992, 221, Struct. Funct. Retinal Proteins, "Light density controls the mechanism of the photocycle of bacteriorhodopsin"), 1992, no month available.

W. Ernst et al., "Reversal of Photoreceptor Bleaching and Adaptation by Microsecond Flashes", Vision Research, vol. 19, (pp. 363–365) 1979. month unavailable.-

LIGHT IRRADIATION METHOD AND ITS APPARATUS

BACKGROUND OF THE INVENTION

1. Field of the Invention

The present invention relates to a light irradiation method and its apparatus, usable in, for example, general illumination light source, industrial illumination light source, and display device.

2. Related Art of the Invention

Various illumination appliances are developed and utilized at the present. The fluorescent lamp which is used most widely among artificial light sources is realized to have a high efficiency and long life owing to optimization of design of phosphor, electrodes and sealing gas. Moreover, on the basis of studies on spectral power distribution of light source and color reproducibility, lamps showing the colors more brilliantly have been developed and utilized.

These conventional illuminators are designed to irradiate with stationary light in the status of use. In light irradiation, to intensify the illumination, known methods are to change to an illumination apparatus of higher output or to increase the electric power supplied to the light source, among other methods.

Anyway, to intensify the photosensitization by irradiation with light (to feel the light more sensitively by visual function), there was no other method than to increase the total quantity of photons in a specific time.

SUMMARY OF THE INVENTION

It is hence an object of the invention to present a light irradiation method and its apparatus capable of intensifying photosensitization by irradiation with light, without increasing the total quantity of photons in a specific time.

In the first place, photosensitization by irradiation with stationary light is explained.

Referring now to FIG. 7, there is shown therein a schematic diagram of human visual function. A man sees an image captured by the eyeball 5, which is projected on the retina 6, in which the image is transformed into a neuroelectric signal. When the neuroelectric signal is transmitted to the cerebral visual region 9 through an optic chiasma 7 and a lateral geniculate body 8, the man recognizes the image.

The structure of the retina 6 is specifically shown in FIG. 8. The retina 6 comprises photoreceptor cells 1, horizontal cells 10, bipolar cells 11, amacrine cells 12, and ganglion cells 13. A brightness signal generated by ion channel control performed in the photoreceptor cells 1 is transmitted to the ganglion cells 13 via horizontal cells 10, bipolar cells 11, and amacrine cells 12. This brightness signal is outputted from the ganglion cells 13 as neuroelectric signal.

An outline of process to achieve ion channel control relating to the brightness signal performed in photoreceptor cells 1 is shown in FIG. 9. The photoreceptor cells 1 has a pigment 2. The pigment 2 is transformed into an intermediate product 3 by chemical reaction in forward direction in the region of femto~microsecond unit. The intermediate product 3 undergoes a thermochemical reaction in a millisecond unit to becomes a pigment decomposed substance 4. This pigment decomposed substance 4 conducts ion channel control, and generates a neuroelectric signal, which is a brightness signal.

In the case of stationary light, however, even after the pigment 2 is transformed into the intermediate product 3, irradiation with light continues, and all of the intermediate product 3 transformed by chemical reaction in forward direction does not become pigment decomposed substance 4, but part of the intermediate product 3 returns to pigment 2 by photochemical reaction in reverse direction in a picosecond unit. At this time, the chemical reaction in forward direction and photochemical reaction in reverse direction reach equilibrium. By the portion of return to the pigment 2 of the intermediate product 3 by photochemical reaction in reverse direction, the brightness by photosensitization is decreased.

Herein, the stationary light refers to the light which is always emitted throughout the duration in which at least the pigment 2 is transformed into the intermediate product 3, and this intermediate product 3 is transformed into the pigment decomposed substance 4. In this sense, the light irradiation by the conventional light source is a stationary light.

A more specific process of transformation of the pigments 2 contained in the photoreceptor cells 1 is shown in FIG. 10. It must be noted beforehand that the photoreceptor cells containing pigments consist of rod cells mainly functioning in the dark (having rod shaped inner segments) and cone cells mainly functioning in the brightness (having pyramid shaped inner segments). Cone cells are further classified into three types of cells differing in the spectral sensitivity. This is to explain the transformation of rhodopsin which is a pigment of rod cell more obvious in the mechanism of chemical reaction than others. The mechanism of chemical reaction of iodopsin which is a pigment of cone cell is similar to that of rhodopsin.

The correspondence between FIG. 9 and FIG. 10 is also described. The component of pigment 2 in FIG. 9 is rhodopsin 14 shown in FIG. 10. The component of the intermediate product 3 in FIG. 9 is lumi-rhodopsin 16 shown in FIG. 10. The pigment decomposed substance 4 in FIG. 9 is meta-rhodopsin II-19 shown in FIG. 10.

Rhodopsin 14 is transformed into batho-rhodopsin 15 by photochemical reaction in picosecond unit, and part of batho-rhodopsin 15 returns to rhodopsin 14 by photochemical reaction in picosecond unit.

Batho-rhodopsin 15 is transformed into lumi-rhodopsin 16 by thermochemical reaction in nanosecond unit, and part of batho-rhodopsin 15 is transformed into iso-rhodopsin 17 by photo chemical reaction in picosecond unit, and part of iso-rhodopsin 17 returns to batho-rhodopsin 15 by photochemical reaction in picosecond unit. Lumi-rhodopsin 16 is transformed into meta-rhodopsin I-18 by thermochemical reaction in microsecond unit, and part of lumi-rhodopsin 16 returns to rhodopsin 14 or iso-rhodopsin 17 by photochemical reaction in picosecond unit. Meta-rhodopsin I-18 is transformed into meta-rhodopsin II-19 by thermochemical reaction in millisecond unit, and part of meta-rhodopsin II-19 returns to meta-rhodopsin I-18 by thermochemical reaction in millisecond unit. This meta-rhodopsin II-19 is responsible for ion channel control, and generates a neuroelectric signal which is a brightness signal.

The ion channel control by meta-rhodopsin II-19 is described below. FIG. 11 is a schematic diagram showing ion motions in the photoreceptor cells 1, and FIGS. 12(*a*) and 12(*b*) are FIG. 12 is a further schematic diagrams summing up the motions of ions. While the photoreceptor cell 1 is not irradiated with light, the ions are in the state as shown in FIG. 12(*a*). Ions $Ca^{2+}$ and $Na^{+}$ of a second gate 23 correspond to neuroelectric signals, but they are taken inside of the photoreceptor cell 1 and are not used as brightness signals.

At this time, when the photoreceptor cell 1 is irradiated with light as shown in FIG. 12(*b*), the pigment 2 in the cell is transformed into the pigment decomposed substance 4. Consequently, the pigment decomposed substance 4 closes the second gate 23. When the second gate 23 is closed, the ions $Ca^{2+}$ and $Na^{+}$ cannot flow into the photoreceptor cell 1 so that the electric potential relating to the membrane of the photoreceptor cell 1 changes. The neuroelectric signal is generated by the propagation of the change. Accordingly, the neuroelectric signal from the photoreceptor 1 reach the ganglion cell 13, as shown in FIG. 8, by way of horizontal cell 10, bipolar cell 11 and amacrine cell 12.

The meta-rhodopsin II-19 is transformed into meta-rhodopsin III-20 by thermochemical reaction in second unit, and meta-rhodopsin III-20 is transformed into opsin+All trans retinaldehyde 21 by thermochemical reaction in minute unit, and then rhodopsin 14 is newly generated by metabolism.

In this process of transformation, however, when the light emitted to the photoreceptor cell 1 is stationary light, lumi-rhodopsin 16 returns to rhodopsin 14. In this case of stationary light, however, the amount of lumi-rhodopsin returning from lumi-rhodopsin 16 to rhodopsin 14 is not whole but limited to part owing to the following reasons:

Chemical reaction in forward direction for transforming rhodopsin 14 into lumi-rhodopsin 16 comprises both a photochemical reaction and a thermochemical reaction;

The duration in picosecond unit required in photochemical reaction of lumi-rhodopsin 16 to return to rhodopsin 14 corresponds to the duration of individual photochemical reactions of lumi-rhodopsin elements irradiated with photons (therefore, the lumi-rhodopsin 16 deformed from rhodopsin 14 by chemical reaction in forward direction generates photochemical reaction in reverse direction to return to rhodopsin 14, depending on the time of photons emitted to the lumi-rhodopsin and the number of lumi-rhodopsin elements irradiated with photons); and All photons do not contribute to photochemical reaction of returning from lumi-rhodopsin 16 to rhodopsin 14 (the quantum efficiency is not 1).

As a result, in the case of stationary light, the lumi-rhodopsin returning from lumi-rhodopsin 16 to rhodopsin 14 causes to lower the brightness by photosensitization.

In the invention, as shown in FIG. 9, paying attention to the photochemical reaction in reverse direction of returning from intermediate product 3 to pigment 2, it is intended to make brighter the photosensitization by irradiation with light, by suppressing the photochemical reaction in reverse direction, without increasing the total quantity of photons per specific time.

A first aspect of the invention relates to a light irradiation method which comprises, in a process in which a pigment contained in a visual cell is transformed into an intermediate product by photochemical reaction or thermochemical reaction, and the intermediate product undergoes thermochemical reaction to be a pigment decomposed substance, emitting light so as to suppress the photochemical reaction of returning from the intermediate product to the pigment.

Incidentally, the light may possess bright and dark determined on the basis of bright time T1 and dark time T2.

A second aspect of the invention relates to a light irradiation method of emitting light possessing bright and dark determined on the basis of bright time T1 and dark time T2, wherein the bright time T1 and the dark time T2 are determined on the basis of duration required for a pigment contained in a visual cell to be transformed into an intermediate product by photochemical reaction or thermochemical reaction, and duration required for the intermediate product to be a pigment decomposed substance by thermochemical reaction.

A third aspect of the invention relates to a light irradiation method of emitting light possessing bright and dark determined on the basis of bright time T1 and dark time T2, wherein the bright time T1 corresponds to duration required for a pigment contained in a visual cell to be transformed into an intermediate product by photochemical reaction or thermochemical reaction, or under the duration, and the dark time T2 corresponds duration required for the intermediate product to be a pigment decomposed substance by thermochemical reaction, or more than the duration.

A fourth aspect of the invention relates to a light irradiation method of emitting light possessing bright and dark determined on the basis of bright time T1 of 10 microseconds or less, and dark time T2 of 10 microseconds or more.

A fifth aspect of the invention relates to a light irradiation apparatus comprising a light source for emitting light, energy feed means for feeding energy for emitting the light to the light source, control means for controlling bright and dark of the light emitted from the light source, and memory means for storing bright time T1 and dark time T2 relating to the bright and dark, wherein the bright time T1 and the dark time T2 are determined preliminarily on the basis of duration required for a pigment contained in a visual cell to be transformed into an intermediate product by photochemical reaction or thermochemical reaction, and duration required for the intermediate product to be a pigment decomposed substance by thermochemical reaction.

A sixth aspect of the invention relates to a light irradiation apparatus comprising a light source for emitting light, energy feed means for feeding energy for emitting the light to the light source, control means for controlling bright and dark of the light emitted from the light source, and memory means for storing bright time T1 and dark time T2 relating to the bright and dark, wherein the bright time T1 corresponds to duration required for a pigment contained in a visual cell to be transformed into an intermediate product by photochemical reaction or thermochemical reaction, or under the duration, and the dark time T2 corresponds duration required for the intermediate product to be a pigment decomposed substance by thermochemical reaction, or more than the duration.

A seventh aspect of the invention relates to a light irradiation apparatus comprising a light source for emitting light, energy feed means for feeding energy for emitting the light to the light source, control means for controlling bright and dark of the light emitted from the light source, and memory means for storing bright time T1 and dark time T2 relating to the bright and dark, wherein the bright time T1 is 10 microseconds or less, and the dark time T2 is 10 microseconds or more.

A eighth aspect of the invention relates to a light irradiation apparatus comprising a light source for emitting light, and control means for controlling bright and dark of the light emitted from said light source, wherein in a process in which a pigment contained in a visual cell is transformed into an intermediate product by photochemical reaction or thermochemical reaction, and the intermediate product undergoes thermochemical reaction to be a pigment decomposed substance, the light is emitted so as to suppress photochemical reaction of returning from the intermediate product to the pigment.

Incidentally, the visual cell may be a photoreceptor cell.

Further, the bright and dark of the light may be determined on the basis of a total quantity of photons in a specific time.

Moreover, the pigment may be rhodopsin, the pigment decomposed substance may be meta-rhodopsin I, meta-rhodopsin II or meta-rhodopsin III, and the intermediate product may be substance between the pigment and the pigment decomposed substance.

Furthermore, the pigment may be iodopsin, the pigment decomposed substance may be meta-iodopsin I or meta-iodopsin II, and the intermediate product may be substance between the pigment and the pigment decomposed substance.

BRIEF DESCRIPTION OF THE DRAWINGS

These and other objects, advantages, features, and uses will become more apparent as the description proceeds, when considered with the accompanying drawings in which.

DESCRIPTION OF PREFERRED EMBODIMENTS

Figure 1:
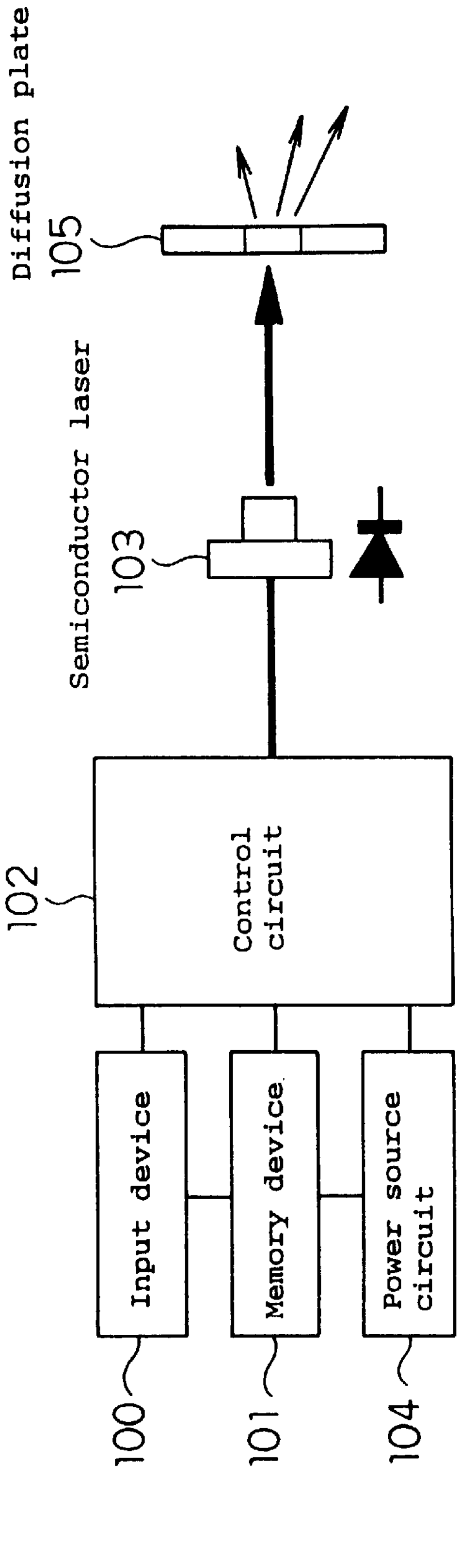
FIG. 1 is a block diagram of an embodiment of a light irradiation apparatus of the invention.

Referring now to FIG. 1, there is shown therein a structural diagram of a first embodiment of a light irradiation apparatus of the invention. That is, an input device 100 is means for input of waveform conditions of continuous pulse light emitted from the apparatus. The pulse width of continuous pulse light is variable within a range of 0.1 to 1 microsecond, and its pulse interval is variable within a range of 10 to 1000 microseconds. A memory device 101 is to store the waveform conditions of continuous pulse light entered in the input device 100. A control circuit 102 is to control the continuous pulse light, on the basis of the pulse width and pulse interval stored in the memory device 101. A semiconductor laser 103 is to emit the continuous pulse light from the control circuit 102, and its oscillation wavelength is 680 nm. A power source circuit 104 is to feed an electric energy to this apparatus. A diffusion plate 105 is to diffuse uniformly the light emitted from the semiconductor laser 103.

The operation of the embodiment is explained below together with the method of light irradiation of the invention. The pulse width and pulse interval, that is, waveform conditions of continuous pulse light are entered through the input device 100. The selection range of the pulse width is 0.1 to 1 microsecond, and the selection range of the pulse interval is 10 to 1000 microseconds. The waveform conditions are stored in the memory device 101. The control device 102 outputs continuous pulse light from the semiconductor laser 103 according to the waveform conditions stored in the memory device 101. The continuous pulse light outputted from the semiconductor laser 103 is diffused by the diffusion plate 105.

Figure 2:
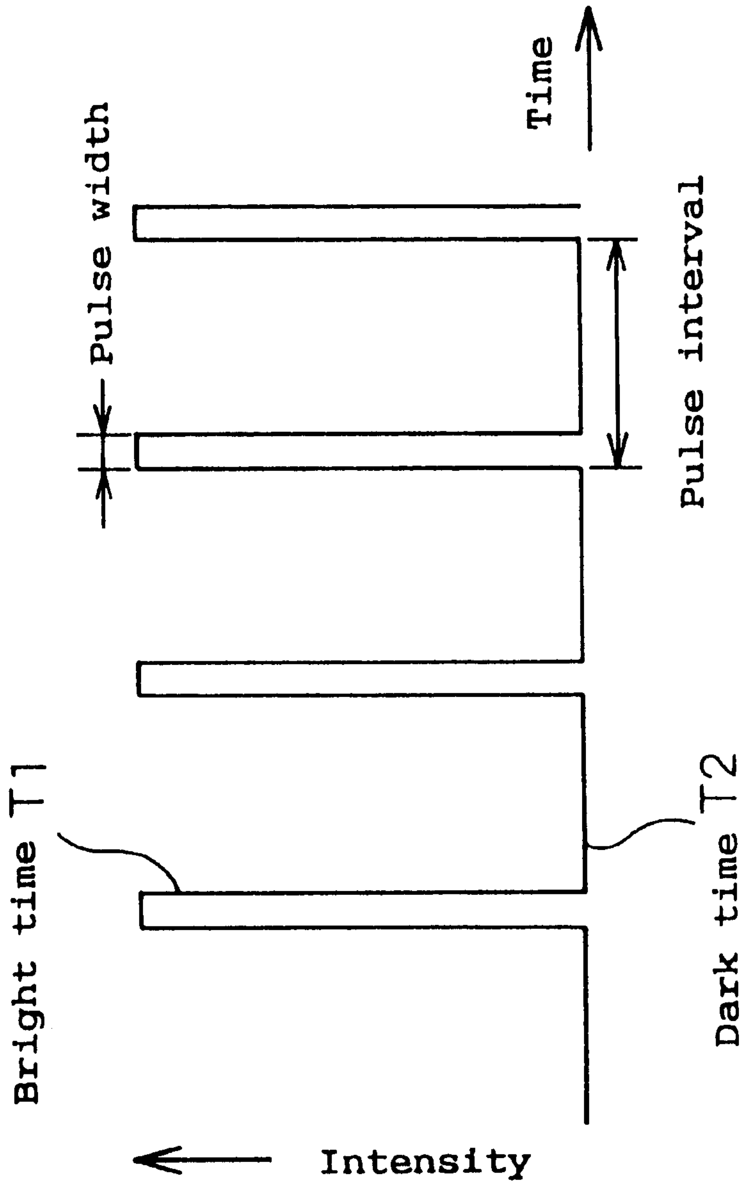
FIG. 2 is a waveform diagram of continuous pulse light outputted from the light irradiation apparatus of the embodiment.
Figure 9:
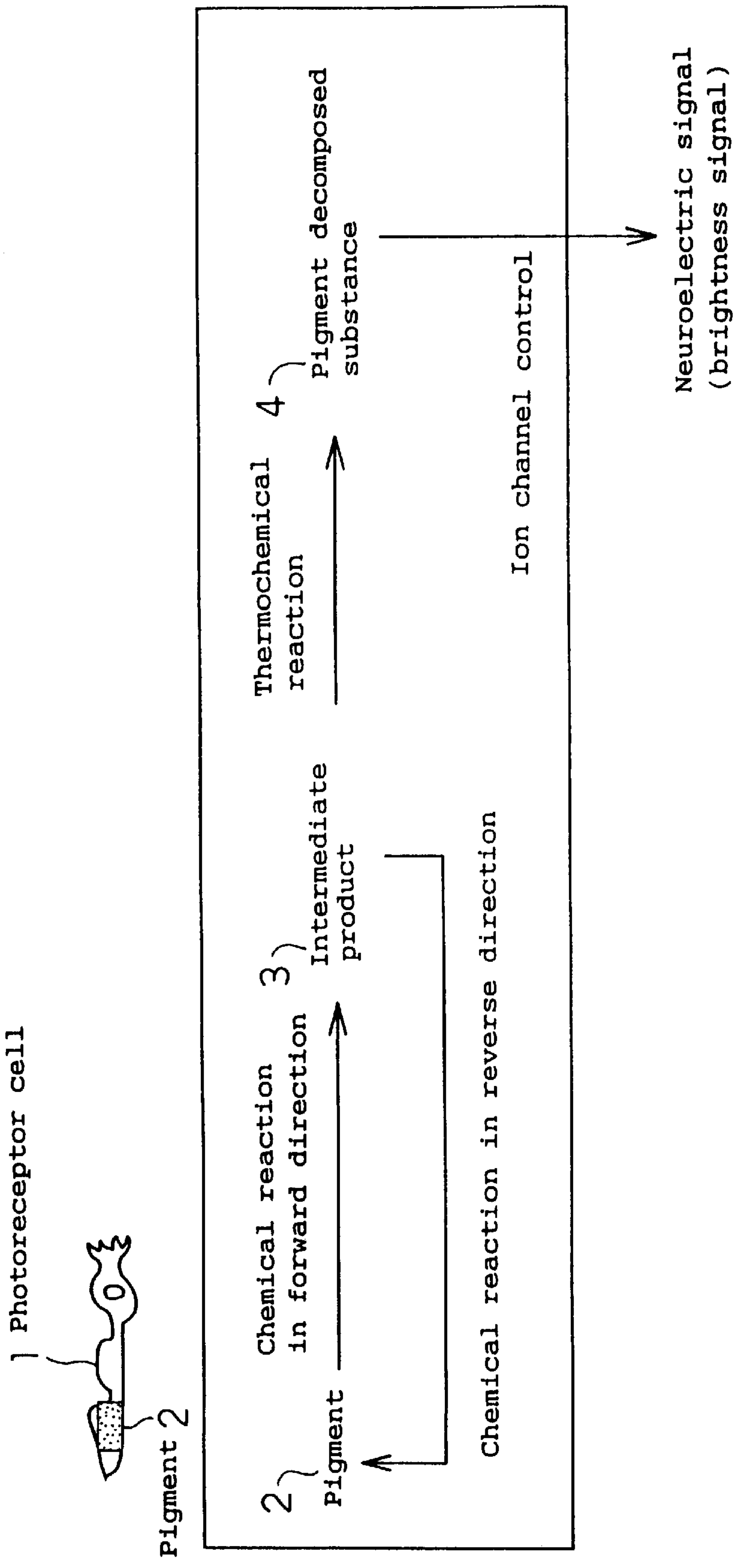
FIG. 9 is a schematic diagram of process to reach ion channel control relating to brightness signal effected in photoreceptor cell 1.
Figure 10:
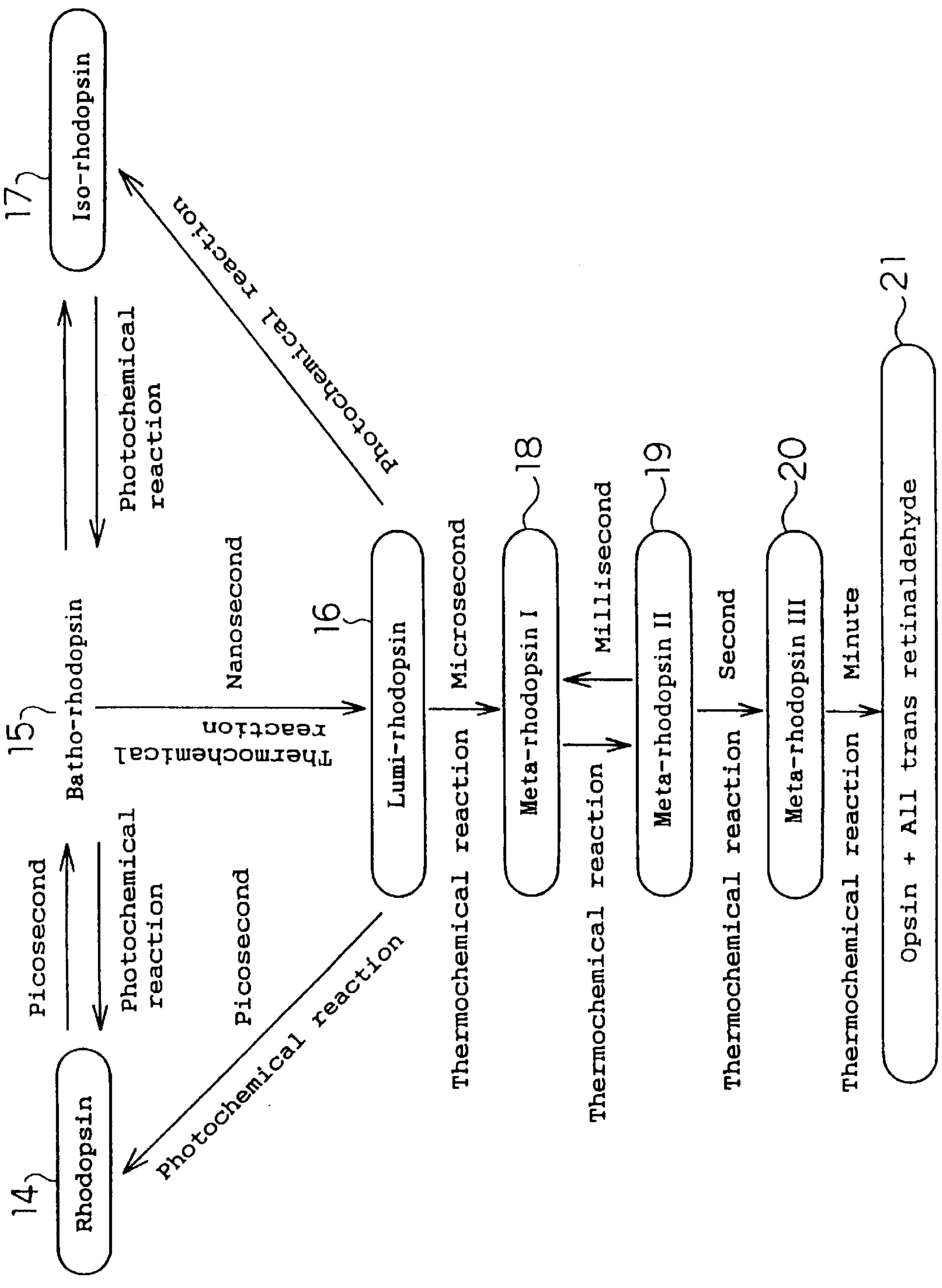
FIG. 10 is a diagram showing a further specific process of deformation of the pigment 2.
Figure 11:
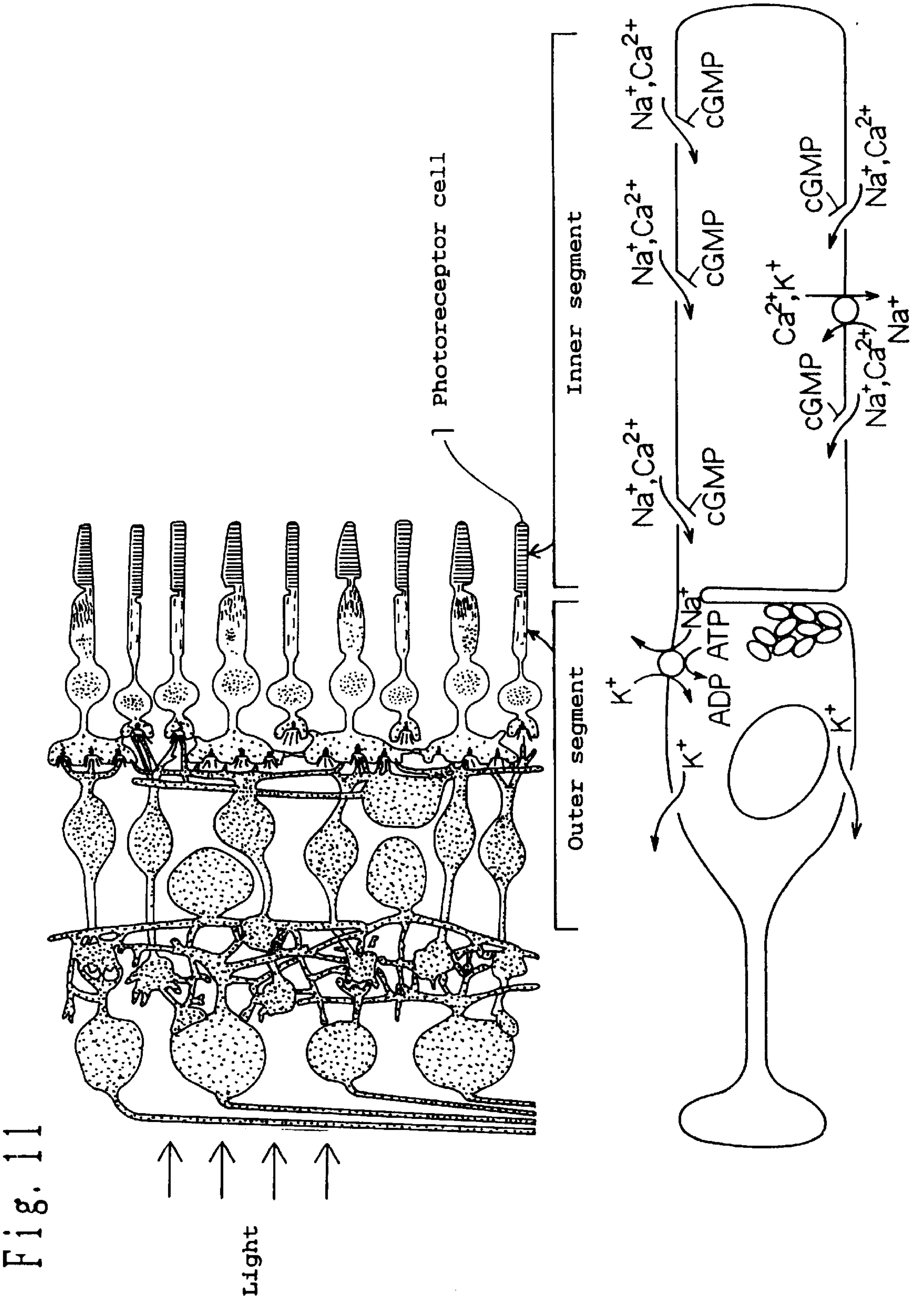
FIG. 11 is a schematic diagram of ion motions in the photoreceptor cell 1.
Figure 12:
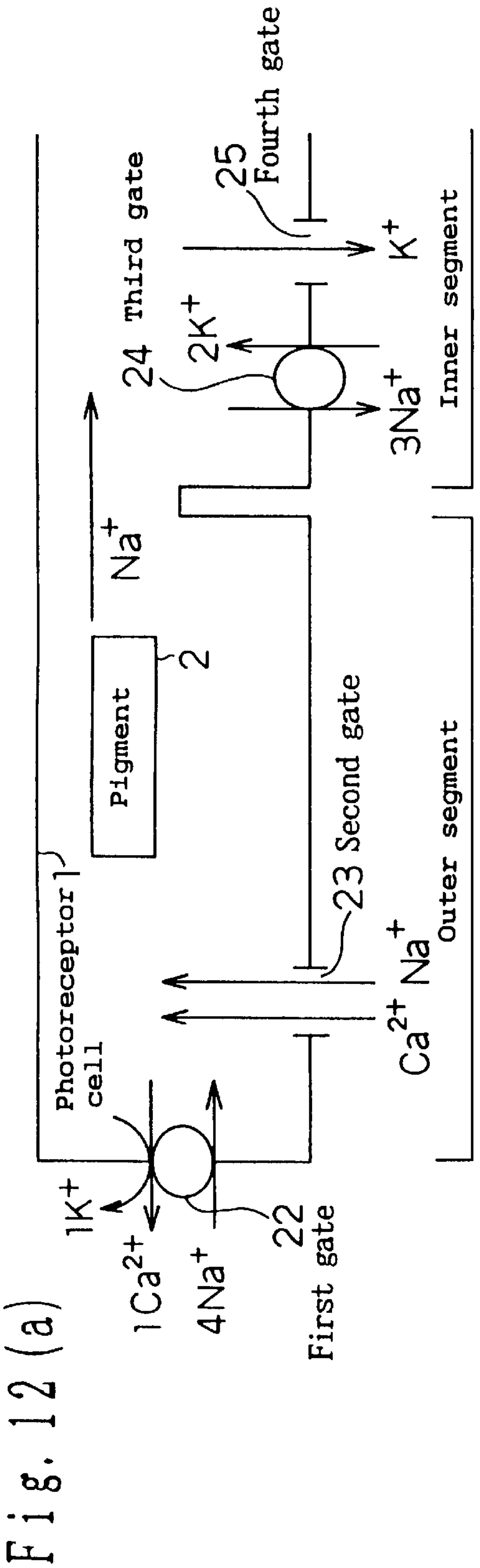
FIG. 12(*a*) and 12(*b*) are further schematic diagrams summing up the motions in FIG. 11.
Figure 12:
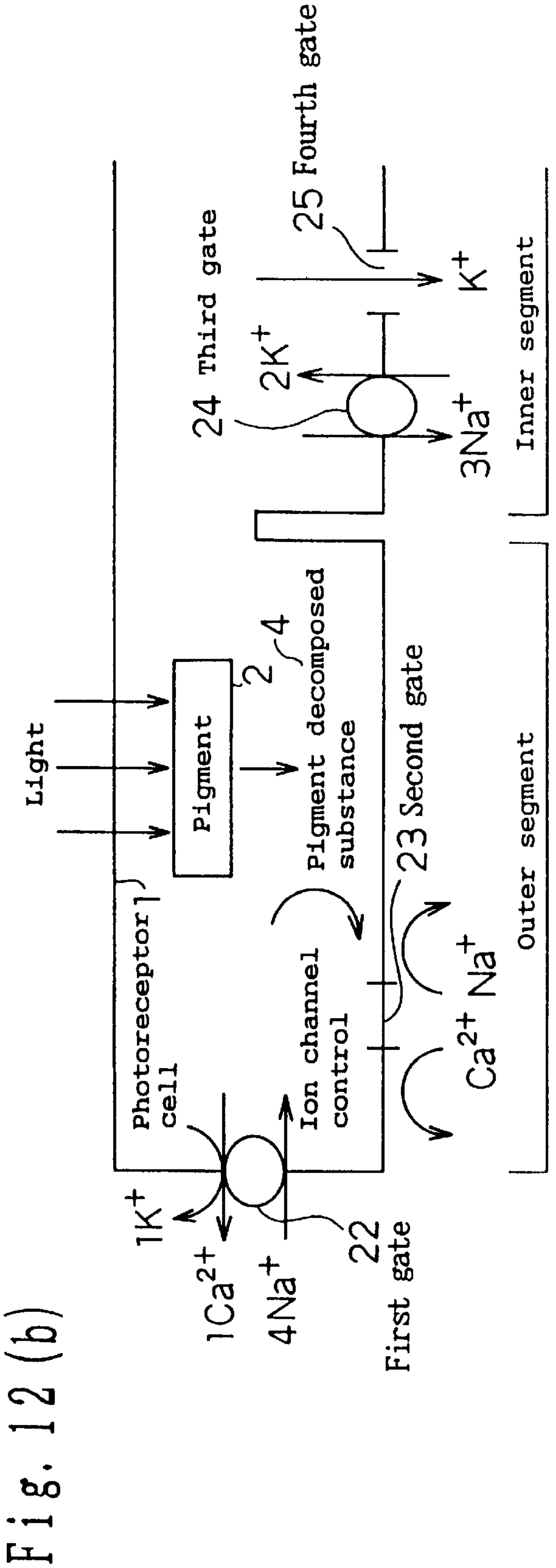

Moreover, when the continuous pulse light sent out from the light irradiation apparatus of the embodiment is emitted to the visual cells, a neuroelectric signal is generated as brightness signal, of which process is described by reference to FIG. 10. In the waveform of the continuous pulse light, herein, as shown in FIG. 2, the bright times T1 for emitting light is the pulse width, and the dark time T2 not emitting light is the balance of the pulse interval minus bright time T1. The correspondence between FIG. 9 and FIG. 10 is as mentioned above. That is, the component of the pigment 2 in FIG. 9 is rhodopsin 14 shown in FIG. 10. The component of the intermediate product 3 in FIG. 9 is lumi-rhodopsin 16 shown in FIG. 10. The component of pigment decomposed substance 4 in FIG. 9 is meta-rhodopsin II-19 shown in FIG. 10.

The continuous pulse light emits light to the rhodopsin 14 for the duration of time T1. It is the nature of rhodopsin 14 to transform into lumi-rhodopsin 16 via batho-rhodopsin 15, by chemical reaction in forward direction which is a photochemical reaction in picosecond unit and a thermochemical reaction in nanosecond unit. Therefore, for the duration of 0.1 to 1 microsecond, the rhodopsin 14 irradiated with light is transformed into lumi-rhodopsin 16 by chemical reaction in forward direction (in this period, the photochemical reaction to return from batho-rhodopsin 15 to rhodopsin 14 is taking place). Afterwards, the lumi-rhodopsin 16 is transformed, through meta-rhodopsin I-18, into meta-rhodopsin II-19 by thermochemical reaction in millisecond unit. This meta-rhodopsin II-19 generates a neuroelectric signal which is a brightness signal, by ion channel control.

Incidentally, after the rhodopsin 14 is transformed into lumi-rhodopsin 16, light irradiation continues for a specific time T3. This time T3 is the balance of bright time T1 minus the time required for rhodopsin 14 to transform into lumi-rhodopsin 16 by chemical reaction in forward direction. Because of irradiation of this light, a photochemical reaction in reverse direction to return from lumi-rhodopsin 16 to rhodopsin 14 occurs. This means that the photochemical reaction in reverse direction depends on the time T3. Therefore, the photochemical reaction in reverse direction to return from lumi-rhodopsin 16 to rhodopsin 14 depends on the bright time T1.

The bright time T1 for light irradiation is followed by the dark time T2 without light irradiation. If the dark time T2 begins during the transformation from lumi-rhodopsin 16 to meta-rhodopsin II-19, the lumi-rhodopsin 16 continues to change to meta-rhodopsin II-19 because this is a thermochemical reaction and not a photochemical reaction. However, if the dark time T2 is over before lumi-rhodopsin 16 is transformed into meta-rhodopsin I-18, and is followed by next bright time T1, a photochemical reaction in reverse direction to return from lumi-rhodopsin 16 to rhodopsin 14 takes place. Hence, the photochemical reaction in reverse direction to return from lumi-rhodopsin 16 to rhodopsin 14 also depends on the dark time T2.

That is, the continuous pulse light outputted from the light irradiation apparatus of the embodiment can suppress the photochemical reaction in reverse direction to return from lumi-rhodopsin 16 to rhodopsin 14, while depending on the bright time T1 and dark time T2. The lumi-rhodopsin 16 suppressed of photochemical reaction in reverse direction is transformed into meta-rhodopsin II-19, and this component causes to increase the neuroelectric signal.

Figure 3:
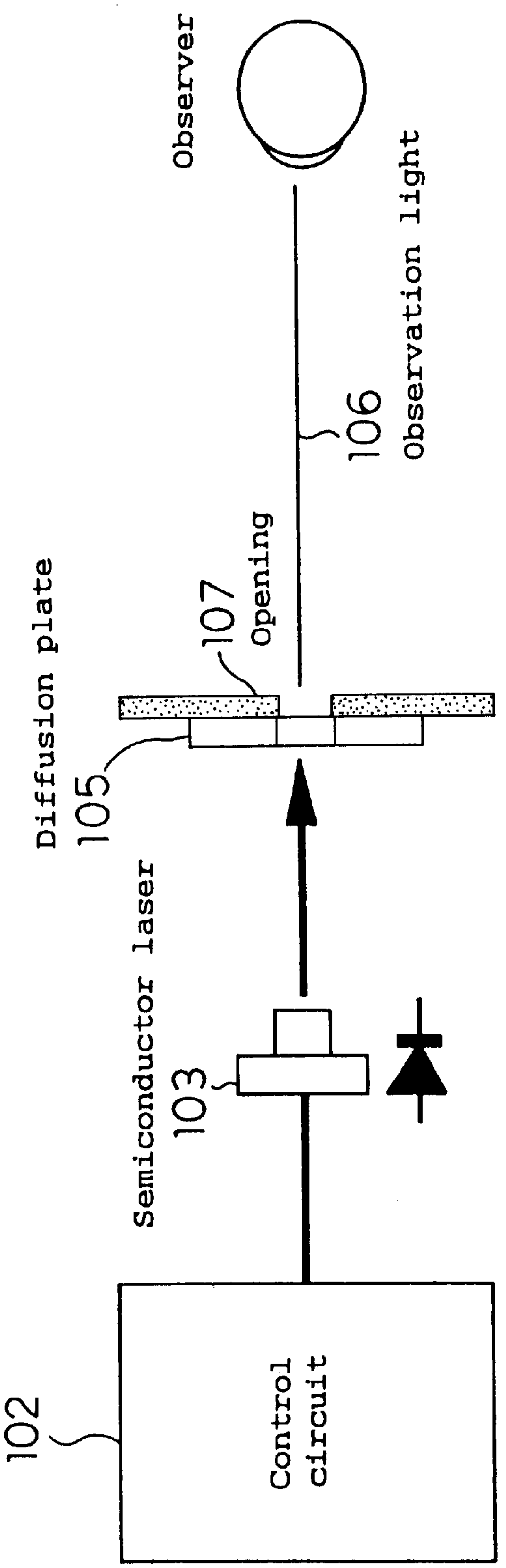
FIG. 3 is a diagram showing a brightness measuring method by flicker photometry in the light irradiation apparatus of the embodiment.
Figure 4:
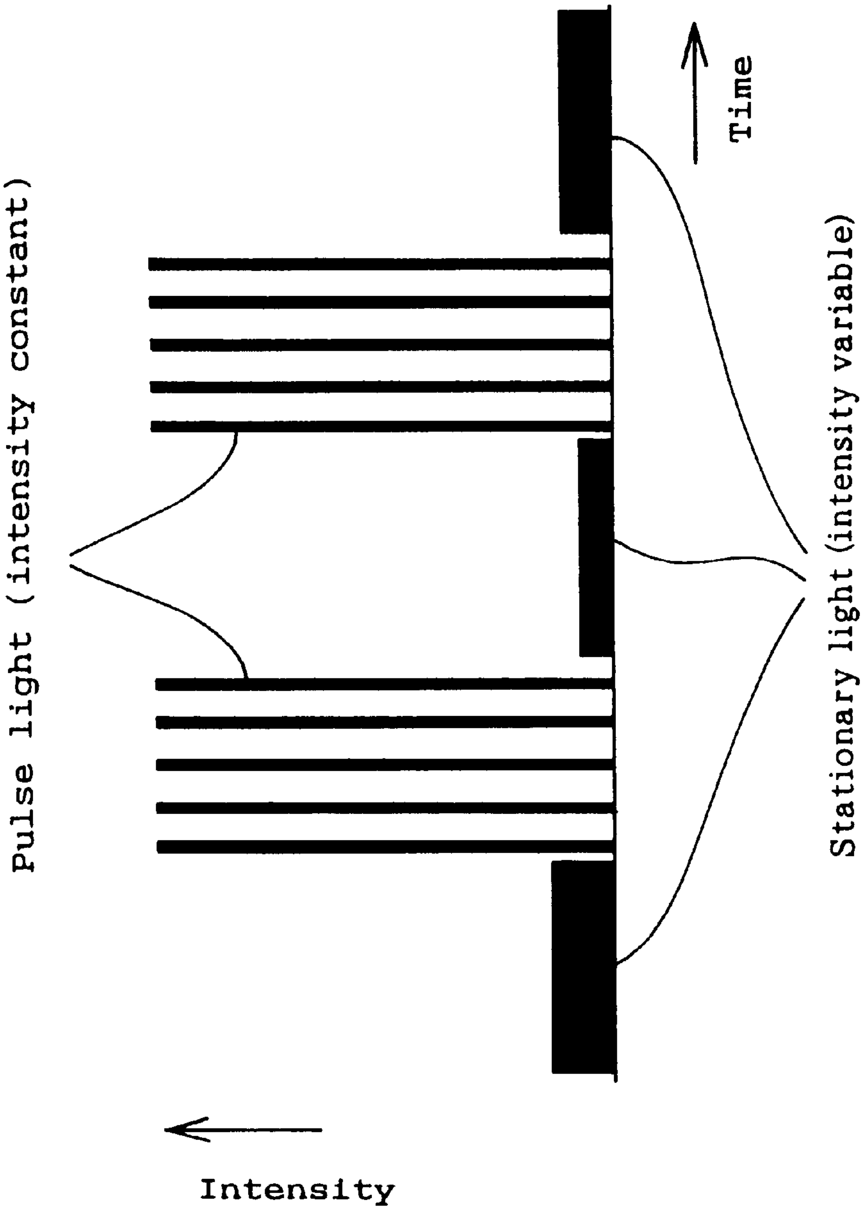
FIG. 4 is a diagram explaining an observation light 106 in FIG. 3.

The results of measurement for verifying the effects of the invention are described below. FIG. 3 shows the measuring method by flicker photometry of brightness by photosensitization of continuous pulse light in the light irradiation apparatus of the embodiment, and FIG. 4 is a diagram explaining observation light 106 in FIG. 3. The observation light 106 shown in FIG. 3 is an alternating light of continuous pulse light of the embodiment with a constant intensity and a direct-current light variable in intensity, by alternating frequency of 10 to 20 Hz. The measurement was based on the feel of flickering by the observer who watched the observation light 106 outputted from an opening 107. That is, the luminance (unit: $cd/m^2$) of the direct-current light matched when the flickering is minimum is regarded as the luminance of the brightness of the continuous pulse light of the embodiment.

Figure 5:
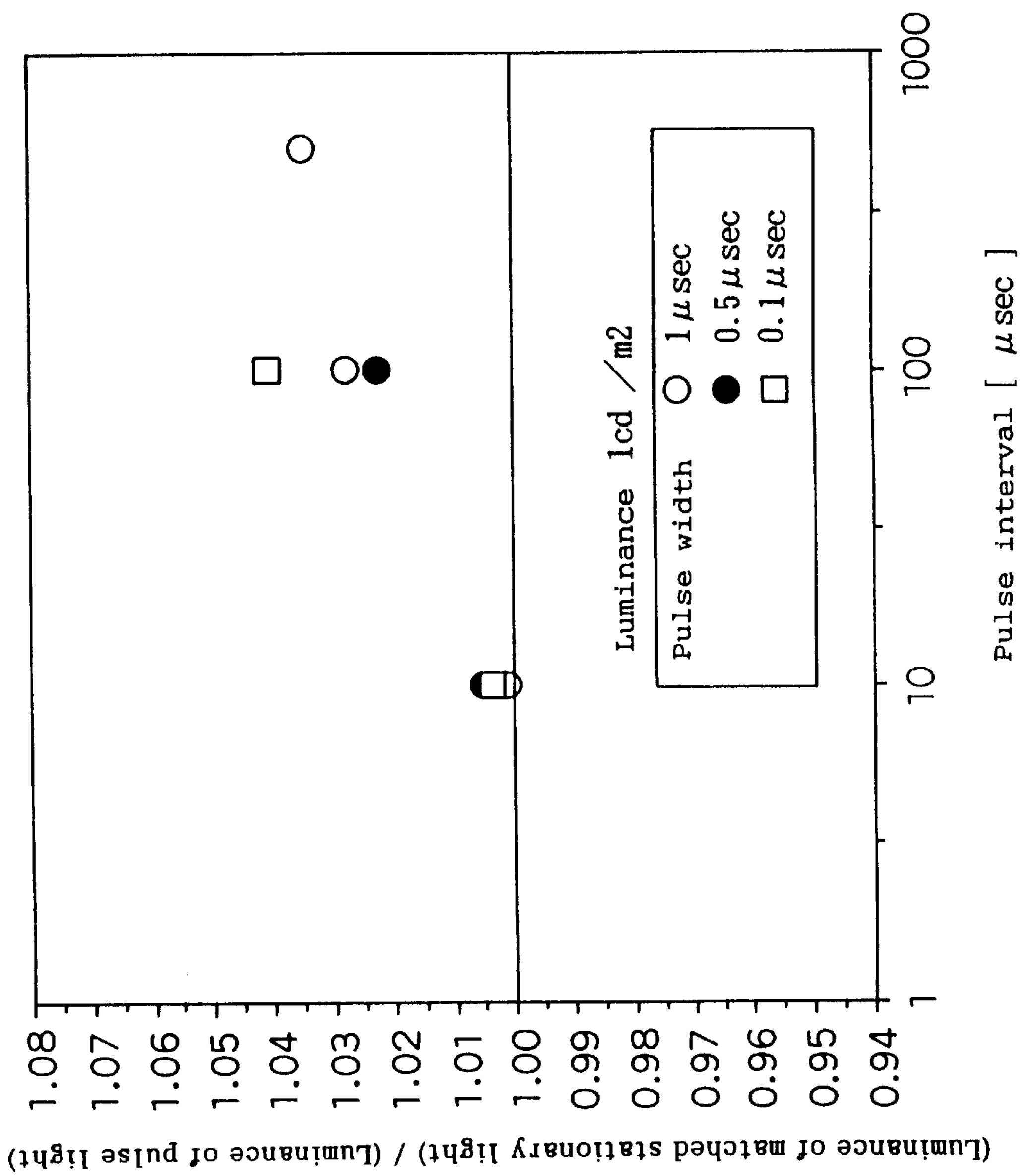
FIG. 5 is a graph showing changes of brightness by photosensitization, by changing the waveform conditions of pulse width and pulse interval of continuous pulse light emitted from the light irradiation apparatus of the embodiment, as measured by flicker photometry.

FIG. 5 is a graph measuring by the flicker photometry the changes of brightness by photosensitization by changes of waveform conditions of the pulse width and pulse interval of the continuous pulse light emitted from the light irradiation apparatus of the embodiment. The axis of abscissas denotes the pulse interval of continuous pulse light. The axis of ordinates represents the ratio of luminance of stationary light to the time average of the luminance of continuous pulse light at the time of matching. However, since the cells stimulated by the light with oscillation wavelength of semiconductor laser of 680 nm are cells having sensitivity in the long wavelength region out of three types of cone cells differing in the spectral sensitivity characteristic, this graph shows the result of experiment when the cone cell of which pigment is iodopsin is functioning.

Accordingly, in the case of continuous pulse light with the pulse width of 0.1 microsecond and pulse interval of 100 microseconds, the value of about 1.04 of {(luminance of matched direct-current light)/(luminance of continuous pulse light)} is explained below. For example, when using continuous pulse light with pulse width of 0.1 microsecond and pulse interval of 100 microseconds for the purpose of a certain brightness, suppose the total quantity of photons is required to be 100. In this case, when realizing this brightness by using stationary light, the total quantity of photons is required about 104, which corresponds to about 1.04 mentioned above, and it suggests that the continuous pulse light suppresses the photochemical reaction in reverse reaction to return from the intermediate product 3 in FIG. 9 to pigment 2. Similarly, the continuous pulse light with the pulse interval of 100 microseconds and pulse width of 0.5 or 1 microsecond, and the continuous pulse light with the pulse interval of 500 microseconds and pulse width of 1 microsecond are also known to suppress the photochemical reaction in reverse direction to return from intermediate product 3 in FIG. 9 to pigment 2.

Incidentally, as shown in FIG. 10, when rhodopsin 14 (pigment 2 in FIG. 9) is transformed into batho-rhodopsin 15, if not irradiated with light, the batho-rhodopsin 15 is transformed into lumi-rhodopsin 16 by thermochemical reaction. Although the intermediate product 3 shown in FIG. 9 is lumi-rhodopsin 16 as shown in FIG. 10 in this embodiment, it may be also batho-rhodopsin 15.

The bright time T1 in the embodiment is in a range of 0.1 to 1 microsecond, but as shown in FIG. 10, it may be also the duration required for rhodopsin 14 (pigment 2 in FIG. 9) to transform into batho-rhodopsin 15 by photochemical reaction or under the duration, or the duration required for rhodopsin 15 (pigment 2 in FIG. 9) to transform into lumi-rhodopsin 16 (intermediate product 3 in FIG. 9) by chemical reaction in forward direction or under the duration. In short, the bright time T1 is not particularly specified as far as it is in a range capable of suppressing the photochemical reaction in reverse direction to return from batho-rhodopsin 15 to rhodopsin 14 (pigment 2 in FIG. 9), and/or photochemical reaction in reverse direction to return from lumi-rhodopsin 16 (intermediate product 3 in FIG. 9) to rhodopsin 14 (pigment 2 in FIG. 9). The effect of the invention when the pulse width is 1 microsecond or less has been experimentally confirmed as shown in FIG. 5, and when the pulse width is 100 microseconds or more, the effect of the invention is not obtained as already confirmed in other experiment. Considering these results of experiments by referring to the scientific finding about photodecomposition by rhodopsin 14 (for example, the report disclosed by Ernst and Kemp in 1979, in Vision Research, Vol. 19, pp. 363–365), it is estimated that the effect of the invention be obtained by flash light for several microseconds or less. It is hence known that the effect of the invention be obtained by the pulse width of 10 microseconds or less.

In the embodiment, by alternating bright time T1 and dark time T2, the intermittent bright time T1 is constant, but it is not always required to be constant.

Incidentally, the intensity of pulse in the bright time T1 of the embodiment is constant, but it is not always required to be constant. In short, it is enough when the required specified total quantity of photons is provided in the bright time T1.

Moreover, as shown in FIG. 10, once the lumi-rhodopsin 16 (intermediate product 3 in FIG. 9) is transformed into meta-rhodopsin I-18, if irradiated with light, the meta-rhodopsin I-18 will not return to the rhodopsin 14 (pigment 2 in FIG. 9). In this embodiment, therefore, the pigment decomposed substance 4 shown in FIG. 9 may be also meta-rhodopsin I-18, instead of meta-rhodopsin II-19 shown in FIG. 10.

The dark time T2 in the embodiment is the balance of the pulse interval time in a range of 10 to 1000 microseconds minus bright time T1, but as shown in FIG. 10, it may also be the duration required for the batho-rhodopsin 15 to transform to meta-rhodopsin I-18 or meta-rhodopsin II-19 (pigment decomposed substance 4 in FIG. 9) by thermochemical reaction or more than the duration, or the duration required for the lumi-rhodopsin 16 (intermediate product 3 in FIG. 9) to transform to meta-rhodopsin I-18 or meta-rhodopsin II-19 (pigment decomposed substance 4 in FIG.

9) by thermochemical reaction or more than the duration. In short, the dark time T2 may be any time in a range capable of suppressing the photochemical reaction in reverse direction to return from batho-rhodopsin 15 to rhodopsin 14 (pigment 2 in FIG. 9), and/or photochemical reaction in reverse direction to return from lumi-rhodopsin 16 (intermediate product 3 in FIG. 9) to rhodopsin 14 (pigment 2 in FIG. 9). That the effect of the invention is obtained in dark time T2 (=pulse interval−pulse width) from 10 microseconds or more has been confirmed experimentally as shown in FIG. 5. To thus obtained continuous pulse light, in order that the flicker may not be sensed, the pulse interval (bright time T1 +dark time T2) should be set at 10 milliseconds or less.

In the embodiment, by alternating bright time T1 and dark time T2, the intermittent dark time T2 is constant, but it is not always required to be constant.

Similarly, the total quantity of photons emitted during the dark time T2 of the embodiment is specified to be 0, but it is not always required to be 0. That is, the total quantity of photons emitted during the dark time T2 may be such a quantity as to be capable of, as shown in FIG. 10, suppressing whole or part of the photochemical reaction in reverse direction to return from the batho-rhodopsin 15 generated during time T2 to rhodopsin 14 (pigment 2 in FIG. 9), and/or photochemical reaction in reverse direction to return from lumi-rhodopsin 16 (intermediate product 3 in FIG. 9) to rhodopsin 14 (pigment 2 in FIG. 9).

Figure 6:
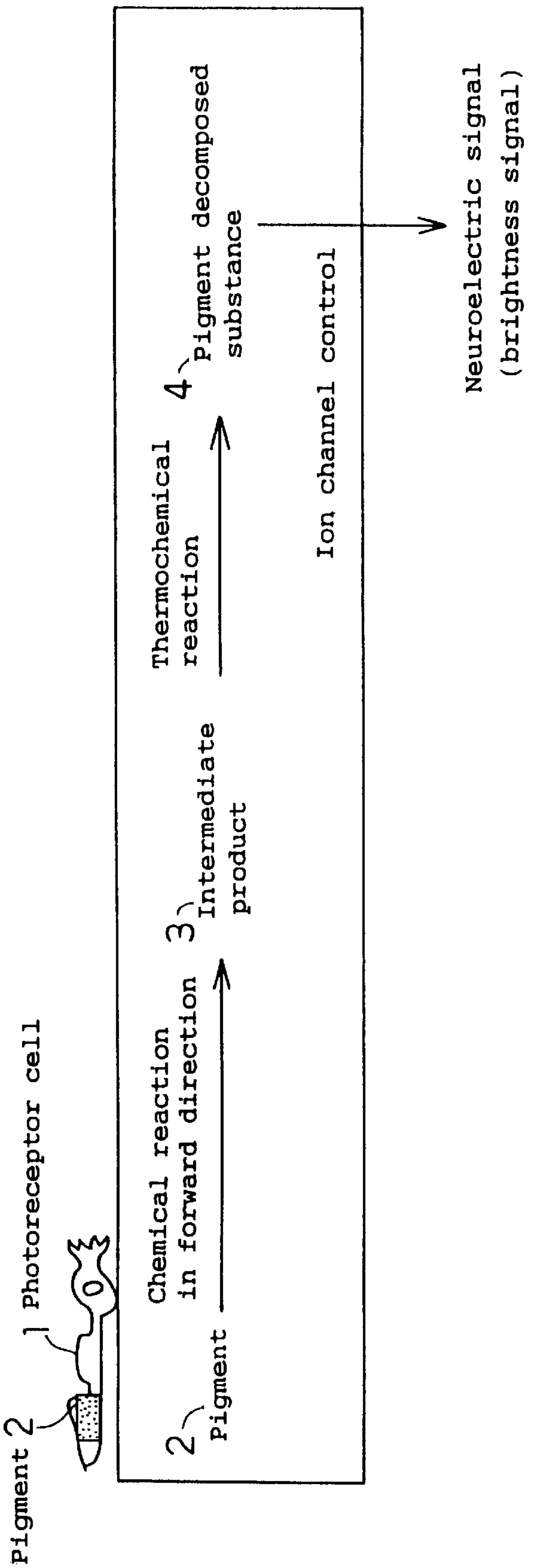
FIG. 6 is a schematic diagram of transformation process of pigment 2, supposing the time required for the pigment 2 to transform into an intermediate product 3 by chemical reaction in forward direction to be bright time T1, and the time required for the intermediate product 3 to be a pigment decomposed substance by thermochemical reaction to be dark time T2.
Figure 7:
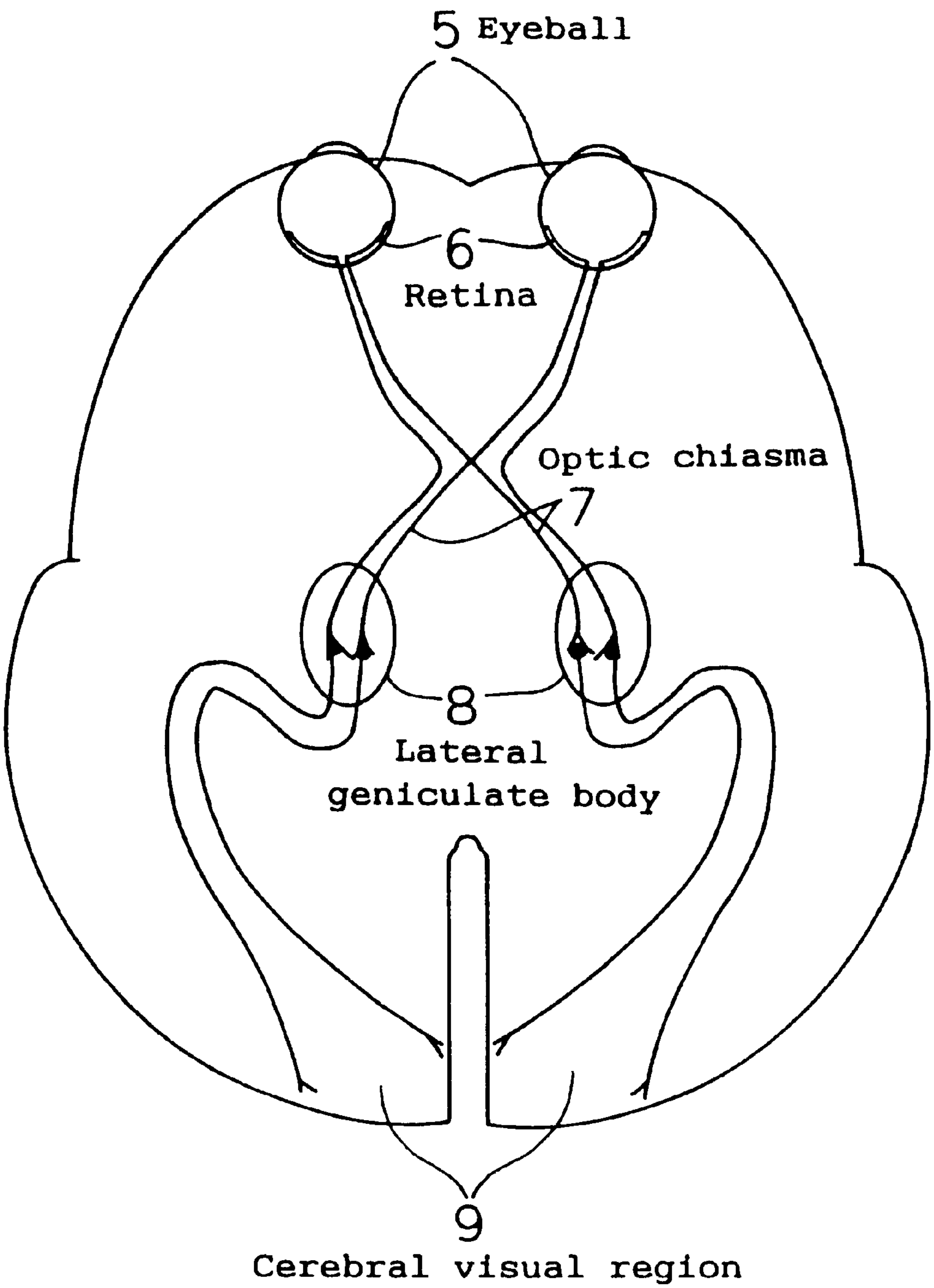
FIG. 7 is a schematic diagram of human visual function.
Figure 8:
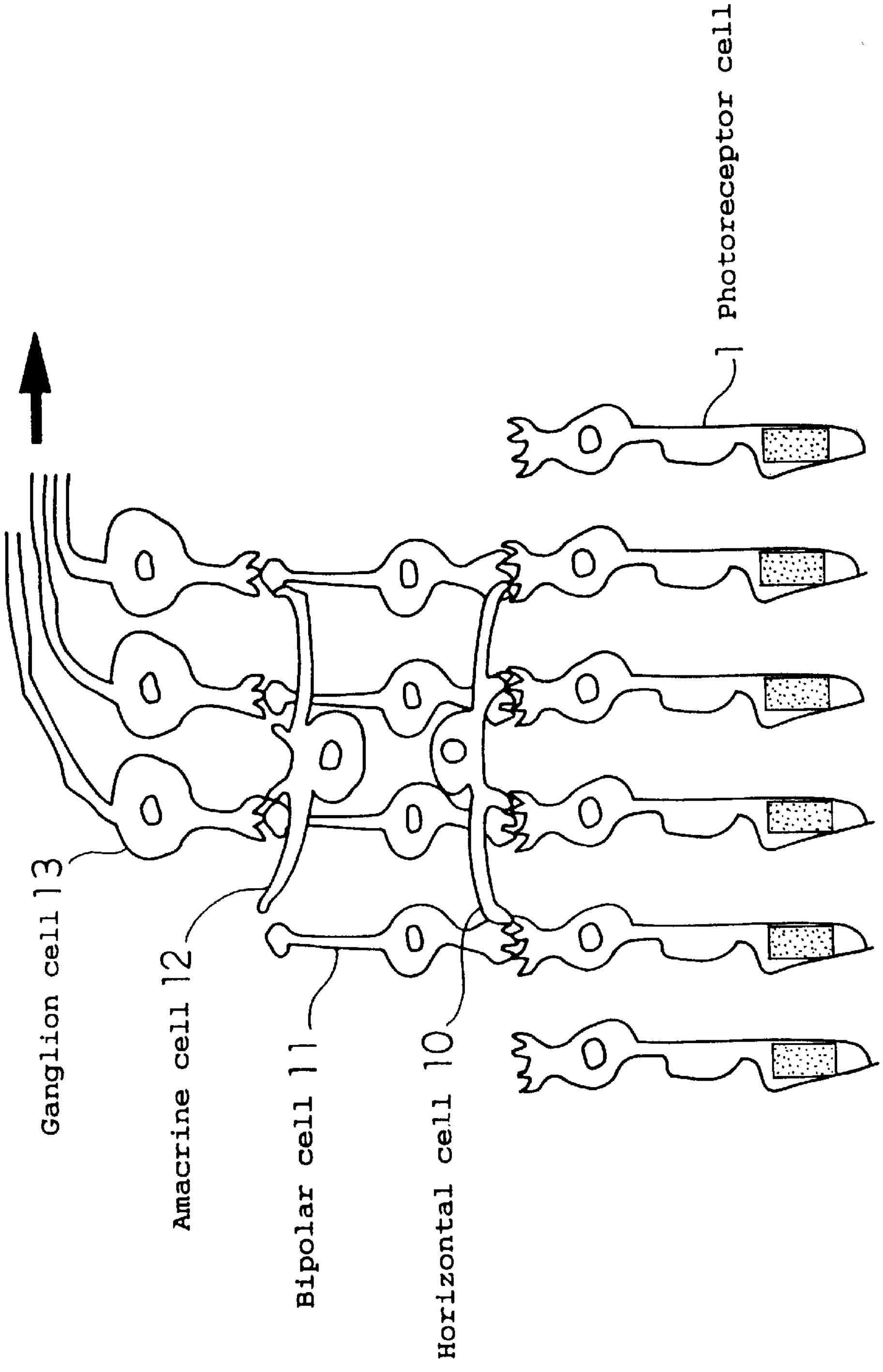
FIG. 8 is a further specific diagram of the structure of the retina 6 in FIG. 7.

In the embodiment, meanwhile, the bright time T1 is a duration in a range of 0.1 to 1 microsecond, and the dark time T2 is the duration of the pulse interval in a range of 10 to 1000 microseconds minus bright time T1, but as shown in FIG. 10, the bright time T1 may be the duration required for rhodopsin 14 (pigment 2 in FIG. 9) to return to lumi-rhodopsin 16 (intermediate product 3 in FIG. 9) by chemical reaction in forward direction, and the dark time T2 may be the duration required for lumi-rhodopsin 16 (intermediate product 3 in FIG. 9) to return to meta-rhodopsin I-18 or meta-rhodopsin II-19 (pigment decomposed substance 4 in FIG. 9) by thermochemical reaction. At this time, when the rhodopsin 14 (pigment 2 in FIG. 9) is transformed into lumi-rhodopsin 16 (intermediate product 3 in FIG. 9), the bright time T1 is terminated, and the dark time T2 continues until the lumi-rhodopsin 16 (intermediate product 3 in FIG. 9) is transformed into meta-rhodopsin I-18 or meta-rhodopsin II-19 (pigment decomposed substance 4 in FIG. 9). Therefore, as shown in FIG. 6, the photochemical reaction in reverse direction to return from the intermediate product 3 (lumi-rhodopsin 16 in FIG. 10) to pigment 2 (rhodopsin 14 in FIG. 10) can be apparently removed.

The visual cell of the embodiment is the human visual cell, but it may be also the visual cell of other animal than human.

Moreover, the light irradiation apparatus in FIG. 1 in the embodiment is designed to emit continuous pulse light to lumi-rhodopsin 16 in FIG. 10 so as to suppress photochemical reaction in reverse direction, but the light irradiation apparatus of the invention may emit light to either part or whole of the substances between rhodopsin 14 and meta-rhodopsin III-20 so as to suppress photochemical reaction in reverse direction.

Figure 13:
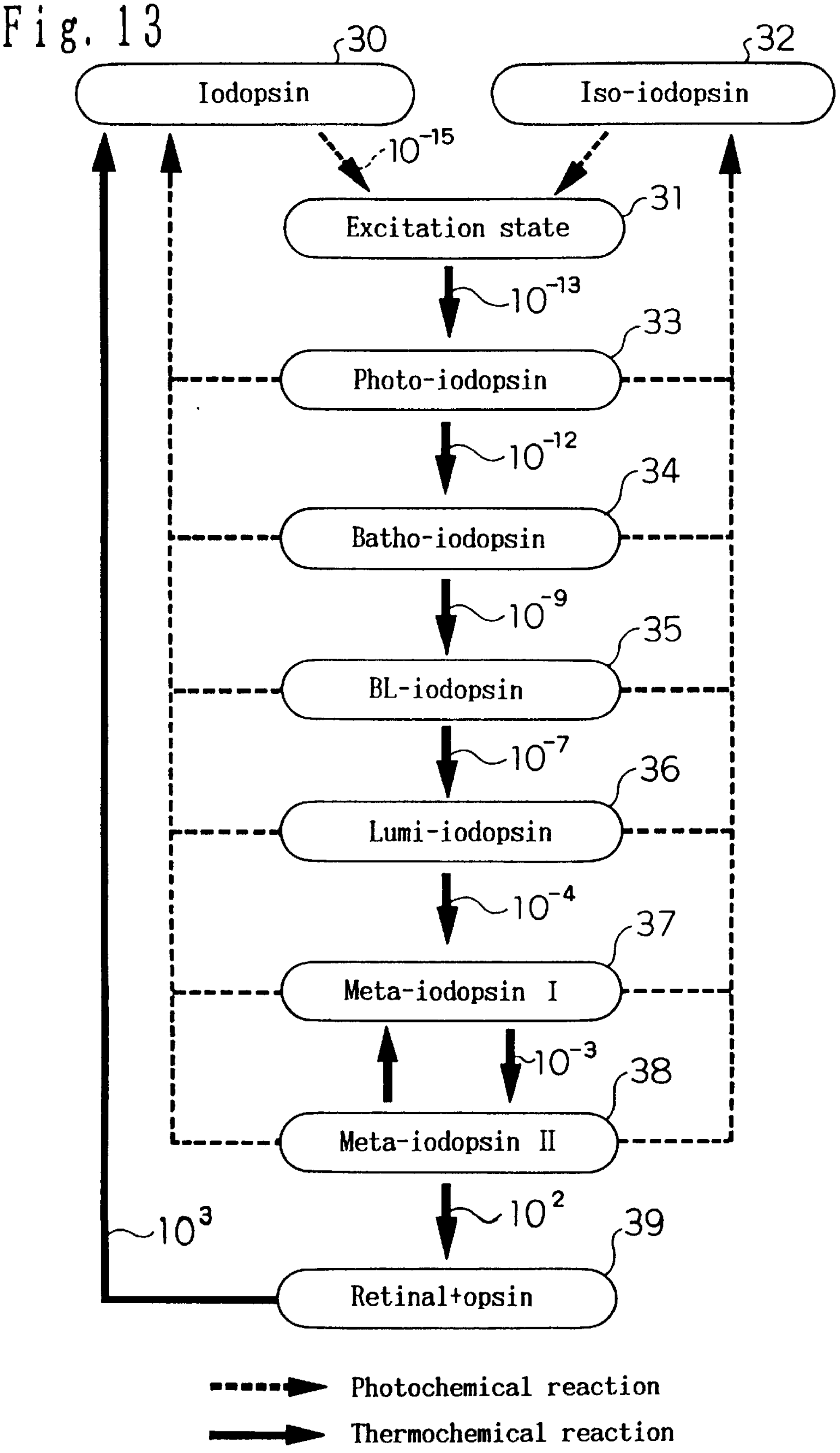
FIG. 13 is a diagram showing a specific process of deformation of iodopsin.

A second embodiment of method and apparatus of light irradiation of the invention is described while referring to FIG. 13 showing transformation process where pigment 2 is iodopsin. That is, the photoreceptor cell 1 in the embodiment is not a rod cell (having a rod shaped internal segment) of which component of pigment 2 is rhodopsin 14, but a cone cell (having a cone-shaped internal segment) of which component of pigment 2 is iodopsin.

First, the transformation process of iodopsin is explained. Iodopsin 30 is set in excited state 31 by irradiation with light in about $10^{-15}$ seconds. Similarly, iso-iodopsin 32 is also set in excited state 31. The iodopsin 30 or iso-iodopsin 32 falling in excited state 31 is transformed into photo-iodopsin 33 by thermochemical reaction in about $10^{-13}$ seconds.

The photo-iodopsin 33 is transformed into batho-iodopsin 34 by thermochemical reaction in about $10^{-12}$ seconds. At this time, when irradiated with light, part of photo-iodopsin 33 returns to iodopsin 30 or iso-iodopsin 32 by photochemical reaction in reverse direction.

Batho-iodopsin 34 is transformed into BL-iodopsin 35 by thermochemical reaction in about $10^{-9}$ seconds. At this time, when irradiated with light, part of batho-iodopsin 34 returns to iodopsin 30 or iso-iodopsin 32 by photochemical reaction in reverse direction.

BL-iodopsin 35 is transformed into lumi-iodopsin 36 by thermochemical reaction in about $10^{-7}$ seconds. At this time, when irradiated with light, part of BL-iodopsin 35 returns to iodopsin 30 or iso-iodopsin 32 by photochemical reaction in reverse direction.

Lumi-iodopsin 36 is transformed into meta-iodopsin I-37 by thermochemical reaction in about $10^{-4}$ seconds. At this time, when irradiated with light, part of lumi-iodopsin 36 returns to iodopsin 30 or iso-iodopsin 32 by photochemical reaction in reverse direction.

Meta-iodopsin I-37 is transformed into meta-iodopsin II-38 by thermochemical reaction in about $10^{-3}$ seconds. At this time, when irradiated with light, part of meta-iodopsin I-37 returns to iodopsin 30 or iso-iodopsin 32 by photochemical reaction in reverse direction.

Meta-iodopsin II-38 is transformed into retinal-opsin 39 by thermochemical reaction in about $10^{-2}$ seconds. At this time, when irradiated with light, part of meta-iodopsin II-38 returns to iodopsin 30 or iso-iodopsin 32 by photochemical reaction in reverse direction. Besides, part of meta-iodopsin II-38 returns to meta-iodopsin I-37 by thermochemical reaction in reverse direction.

Retinal-opsin 39 returns to iodopsin 30 by metabolism in about $10^{-3}$ seconds.

Explained below is the case of irradiation of iodopsin 30 with continuous pulse light by the light irradiation apparatus in FIG. 1. The iodopsin 30 is inclined to transform into lumi-iodopsin 36 through batho-iodopsin 34 or the like by the photochemical reaction and thermochemical reaction. Therefore, the iodopsin 30 irradiated with light for the time of 0.1 to 1 microsecond is transformed into lumi-iodopsin 36 by chemical reaction in forward direction. (At this time, the photochemical reaction to return from batho-iodopsin 34 or the like to iodopsin 30 takes place.)

Afterwards, through meta-iodopsin I-37, lumi-iodopsin 36 is transformed into meta-iodopsin II-38 by thermochemical reaction in the unit of millisecond. This meta-iodopsin II-38 generates a neuroelectric signal which is a signal of lightness by ion channel control.

Incidentally, after the iodopsin 30 is transformed into lumi-iodopsin 36, the light irradiation continues for specific time T3. This time T3 is the balance of bright time T1 minus "the time required for transforming iodopsin 30 into lumi-iodopsin 36 by chemical reaction in forward direction". Because of irradiation of this light, a photochemical reaction in reverse direction of returning from lumi-iodopsin 36 to iodopsin 30 occurs. It means that the photochemical reaction in reverse direction of returning from lumi-iodopsin 36 to iodopsin 30 depends on the time T3. Therefore, the photochemical reaction in reverse direction of returning from lumi-iodopsin 36 to iodopsin 30 depends in the bright time T1.

Irradiation of light for bright time T1 is followed by dark time Tp2 without light irradiation. In the process of transformation of lumi-iodopsin 36 into meta-iodopsin II-38, if changed over to dark time T2, this transformation is a thermochemical reaction, not photochemical reaction, and hence lumi-iodopsin 36 is transformed into meta-iodopsin II-38. However, if the dark time T2 is terminated and next bright time T1 began before lumi-iodopsin 36 is transformed into meta-iodopsin I-37, a photochemical reaction in reverse direction of returning from lumi-iodopsin 36 to iodopsin 30 occurs. Therefore, the photochemical reaction in reverse direction of returning lumi-iodopsin 14 to iodopsin 14 also depends on the dark time T2.

That is, the continuous pulse light emitted from the light irradiation apparatus in FIG. 1 can suppress the photochemical reaction in reverse direction of returning from lumi-iodopsin 36 into iodopsin 30, while depending on the bright time T1 and dark time T2. The lumi-iodopsin 36 suppressed of photochemical reaction in reverse direction is transformed into meta-iodopsin II-38, and this portion contributes to increase the neuroelectric signal. This result of experiment is shown in FIG. 5.

The light irradiation apparatus in FIG. 1 in this embodiment is designed to emit continuous pulse light to the lumi-iodopsin 36 in FIG. 13 so as to suppress the photochemical reaction in reverse direction, but the light irradiation apparatus of the invention may be also designed to emit light to part or whole of the substances between iodopsin 30 and meta-iodopsin II-38 so as to suppress the photochemical reaction in reverse direction.

Thus, the invention has the effects of making brighter the photosensitization by irradiation with light, without increasing the total quantity of photons by irradiation with light in a specific time.

What is claimed is:

1. A light irradiation method used for one of a display device and an illumination light source comprising the steps of:

- emitting light of a first quantity of light during a time period T1;
- transforming a pigment photoreceptor cell in vivo into an intermediate product by at least one of a first photochemical and a first thermochemical reaction;
- emitting light of a second quantity light during a time period T2, the second quantity of light is less than said first quantity of light, wherein T2 is greater than T1 and said time period T2 is adjacent to said time period T1;
- transforming said intermediate product in said photoreceptor cell in vivo into a pigment decomposed substance by a second thermochemical reaction; and
- timing the duration of T1 and T2 for avoiding, in response to at least one of said first photochemical reaction and said second thermochemical reaction, a second photochemical reaction in said photoreceptor cell in vivo which would otherwise transform said intermediate product into said pigment by alternately and continuously repeating said step of emitting said first quantity of light and said step of emitting light of said second quantity of light; wherein said T1 has a duration that is less than or equal to the pigment-to-intermediate product transformation time, and said T2 has a duration that is at least equal to the intermediate product-to-pigment decomposed substance transformation time.

2. The light irradiation method used for one of a display device and an illumination light source according to claim 1, wherein T1 is determined based on a pigment-to-intermediate product transformation time in which said pigment transforms into said intermediate product, and T2 is determined based on an intermediate product-to-pigment decomposed substance transformation time in which said intermediate product transforms into said pigment decomposed substance.

3. The light irradiation method used for one of a display device and an illumination light source according to claim 1, wherein T1 is more than or equal to one picosecond and less than or equal to 10 microseconds, and T2 is in the range between 10 microseconds and 10 milliseconds.

4. The light irradiation method used for one of a display device and an illumination light source according to claim 1, wherein the first quantity of light emitted during T1 is determined based on a total quantity of photons emitted during T1 and the second quantity of light emitted in T2 is determined based on a total quantity of photons emitted in T2.

5. The light irradiation used for one of a display device and an illumination light source according to claim 4, wherein the total quantity of photons emitted during T2 is less than the total quantity of photons emitted during T1.

6. The light irradiation method used for one of a display device and an illumination light source according to claim 5, wherein the total quantity of photons emitted during T2 is zero.

7. The light irradiation method used for one of a display device and an illumination light source according to claims 1 or 2, wherein

- said pigment is rhodopsin,
- said pigment decomposed substance is selected from the group consisting of meta-rhodopsin I, meta-rhodopsin II and meta-rhodopsin III, and
- said intermediate product is an intermediary substance between said pigment and said pigment decomposed substance.

8. The light irradiation used for one of a display device and an illumination light source according to claims 1 or 2, wherein

- said pigment is iodopsin,
- said pigment decomposed substance is selected from the group consisting of meta-iodopsin I and meta-iodopsin II, and
- said intermediate product is an intermediary substance between said pigment and said pigment decomposed substance.

9. A light irradiation apparatus used for one of a display device and an illumination light source comprising:

- a light source for emitting light;
- control means for controlling a quantity of light of said light source;
- memory means for storing a time period T1 and a time period T2 relating to a first quantity of light and a second quantity of light, respectively, said second quantity of light is less than said first quantity of light, and wherein T2 is greater than T1;
- means for transforming a pigment contained in a photoreceptor cell in vivo into an intermediate product by at least one of a first photochemical reaction and a first thermochemical reaction;

means for transforming said intermediate product in said photoreceptor cell in vivo into a pigment decomposed substance by a second thermochemical reaction; and means for timing the duration of T1 and T2 for avoiding, in response to at least one of said first thermochemical reaction and said second thermochemical reaction, a second photochemical reaction in said photoreceptor cell in vivo which would otherwise transform said intermediate product into said pigment by alternate repetition of emitting light of said first quantity of light and emitting light of said second quantity of light, based on time periods T1 and T2 to at least one of said first thermochemical reaction and said second thermochemical reaction, a second photochemical reaction in said photoreceptor cell in vivo which would otherwise transform said intermediate product into said pigment by alternate repetition of emitting light of said first quantity of light and emitting light of said second quantity of light, based on said time period T1 and T2.

10. A light irradiation apparatus used for one of a display device and an illumination light source according to claim 9 wherein said pigment is rhodopsin, said pigment decomposed substance is selected from the group consisting of meta-rhodopsin I, meta-rhodopsin II and meta-rhodopsin III, and said intermediate product is an intermediary substance between said pigment and said pigment decomposed substance.

11. A light irradiation apparatus used for one of a display device and an illumination light source according to claim 9 wherein said pigment is iodopsin, said pigment decomposed substance is selected from the group consisting of meta-iodopsin I and meta-iodopsin II, and said intermediate product is an intermediary substance between said pigment and said pigment decomposed substance.

12. A light irradiation apparatus used for one of a display device and an illumination light source comprising:

a light source for emitting light;

control means for controlling a quantity of light of said light source;

means for transforming a pigment photoreceptor cell in vivo into an intermediate product by at least one of a first photochemical and a first thermochemical reaction;

means for transforming said intermediate product in said photoreceptor cell in vivo into a pigment decomposed substance by a second thermochemical reaction; and means for timing the duration of a time period T1 and a time period T2 relating to a first quantity of light and a second quantity of light, respectively, the second quantity of light is less than said first quantity of light, and T2 is greater than T1.

13. A light irradiation apparatus used for one of a display device and an illumination light source comprising:

light emitting means for emitting a continuous pulsed light comprising light of a first quantity of light during a time period T1 and emitting light of a second quantity of light during a time period T2, wherein T2 is greater than T1;

control means for controlling said light emitting means;

means for transforming a pigment in a photoreceptor cell in vivo into an intermediate product by one of a first photochemical reaction and a first thermochemical reaction;

means for transforming said intermediate product in said photoreceptor cell in vivo into a pigment decomposed substance by a second thermochemical reaction; and means for timing the duration of T1 and T2 for avoiding, in response to at least one of said first thermochemical reaction and said second thermochemical reaction, a second photochemical reaction in said photoreceptor cell in vivo which would otherwise transform said intermediate product into said pigment by alternate repetition of emitting light of said first quantity of light and emitting light of said second quantity of light, based on time periods T1 and T2 to at least one of said first thermochemical reaction and said second thermochemical reaction, a second photochemical reaction in said photoreceptor cell in vivo which would otherwise transform said intermediate product into said pigment alternate repetition of emitting light of said first quantity of light and emitting light of said second quantity of light, based on said time period T1 and T2.

14. The light irradiation apparatus used for one of a display device and an illumination light source according to claim 13, wherein said light emitting means is a laser.

15. The light irradiation apparatus used for one of a display device and an illumination light source according to claim 14, wherein said laser has an oscillation wavelength of 680 nm.

16. The light irradiation apparatus used for one of a display device and an illumination light source according to claim 13, wherein said pigment is rhodopsin, said pigment decomposed substance is selected from the group consisting of meta-rhodopsin I, meta-rhodopsin II and meta-rhodopsin III, and said intermediate product is an intermediary substance between said pigment and said pigment decomposed substance.

17. The light irradiation apparatus used for one of a display device and an illumination light source according to claim 13, wherein said pigment is iodopsin, [p<]bold1 said pigment decomposed substance is selected from the group consisting of meta-iodopsin I and meta-iodopsin II, and said intermediate product is an intermediary substance between said pigment and said pigment decomposed substance.

* * * * *

UNITED STATES PATENT AND TRADEMARK OFFICE

CERTIFICATE OF CORRECTION

PATENT NO. : 6,022,455
DATED : February 8, 2000
INVENTOR(S) : Otake

It is certified that error appears in the above-identified patent and that said Letters Patent is hereby corrected as shown below:

Column 12,
Line 43, after "irradiation" insert -- method --.

Column 13,
Line 12, after "T2", delete lines 12-19.

Column 14,
Line 24, after "T2", delete line 24-31.
Line 53, delete "[p<]bold]".

Signed and Sealed this

Twenty-eighth Day of August, 2001

*Attest:*

NICHOLAS P. GODICI

*Attesting Officer* *Acting Director of the United States Patent and Trademark Office*